(12) United States Patent
Richmond

(10) Patent No.: US 8,668,123 B2
(45) Date of Patent: Mar. 11, 2014

(54) HOLDING APPARATUS FOR A PORTABLE ELECTRONIC DEVICE

(76) Inventor: Julian Richmond, Kennesaw, GA (US)

( * ) Notice: Subject to any disclaimer, the term of this patent is extended or adjusted under 35 U.S.C. 154(b) by 427 days.

(21) Appl. No.: 13/045,507

(22) Filed: Mar. 10, 2011

(65) Prior Publication Data

US 2011/0221316 A1    Sep. 15, 2011

Related U.S. Application Data

(60) Provisional application No. 61/312,661, filed on Mar. 10, 2010.

(51) Int. Cl.
*B60R 7/05* (2006.01)
*B60R 11/02* (2006.01)

(52) U.S. Cl.
USPC .......................... 224/312; 224/552; 224/929

(58) Field of Classification Search
USPC ......... 224/660, 666, 669, 929, 930, 678, 676, 224/269, 552, 312; 455/575.8, 575.9, 90.3; 220/4.31, 4.32; D12/417; 206/320; D3/218
See application file for complete search history.

(56) References Cited

U.S. PATENT DOCUMENTS

| | | | | |
|---|---|---|---|---|
| 2,907,487 A | * | 10/1959 | Harrington | 220/8 |
| 5,060,260 A | * | 10/1991 | O'Connell | 379/454 |
| 5,368,159 A | * | 11/1994 | Doria | 206/320 |
| D357,918 S | * | 5/1995 | Doria | D14/218 |
| 5,562,212 A | * | 10/1996 | Rosler | 206/443 |
| 6,236,312 B1 | * | 5/2001 | Chitsazan et al. | 340/539.32 |
| 6,305,567 B1 | * | 10/2001 | Sulpizio | 220/495.11 |
| 6,318,692 B1 | * | 11/2001 | Cyrell | 248/317 |
| 6,460,817 B1 | * | 10/2002 | Bosson | 248/317 |
| 6,971,699 B2 | * | 12/2005 | Isaacson | 296/37.8 |
| 7,464,827 B2 | * | 12/2008 | Meissen | 220/8 |
| 2001/0032868 A1 | * | 10/2001 | Callahan | 224/548 |
| 2006/0226182 A1 | * | 10/2006 | Dittmar | 224/197 |

* cited by examiner

*Primary Examiner* — Justin Larson
(74) *Attorney, Agent, or Firm* — Crose Law LLC; Bradley D. Crose

(57) ABSTRACT

An apparatus is disclosed to hold a communication device, such as a cellular phone, personal digital assistant, smart phone, or the like, in a manner that provides for hands-free use of the communication device, particularly while driving, visual proximity so that a display of the communication device is easily observed, and audio proximity so that a speaker and a microphone are easily within hearing and speaking distances. The holding apparatus includes one or more clips with which to clip the device onto a visor. The clips provide a degree of rotation about a pivot pin. The body is configurable such that it can hold devices of varying sizes. The body can extend both vertically and horizontally to accommodate longer and wider devices. In at least one embodiment, the body is sectioned into four quarters that can extend and retract to accommodate many varied sizes of devices.

11 Claims, 21 Drawing Sheets

HOLDING APPARATUS FOR A PORTABLE ELECTRONIC DEVICE

CROSS-REFERENCE TO RELATED APPLICATION

The present non-provisional patent application claims the benefit of priority of Provisional Patent Application No. 61/312,661, which is entitled HOLDING APPARATUS FOR A PORTABLE ELECTRONIC DEVICE and which was filed Mar. 10, 2010 which is incorporated in full by reference herein.

FIELD OF THE INVENTION

The technology described herein relates generally to holding devices to contain an electronic apparatus. More specifically, this technology relates to an apparatus to hold a communication device, such as a cellular phone, personal digital assistant, smart phone, or the like, in a manner that provides for hands-free use of the portable communication device, particularly while driving, visual proximity between the device and the driver so that a display of the communication device is easily observed, and audio proximity between the device and the driver so that a speaker and a microphone on the electronic device are easily within hearing and speaking distances.

BACKGROUND OF THE INVENTION

Personal communication devices, such as cellular phones, personal digital assistants, smart phones, or the like, are known and are nearly ubiquitous. However, numerous ergonomic issues exist with these devices. By way of example, use of such personal communication devices while driving an automobile, for example, can be particularly problematic and raise many human factors concerns that must be considered.

Drivers who utilize a personal communication device in a manner that is not hands-free, such as holding a phone to the ear with one hand while placing a call, are visually impaired to one side. Additionally, drivers who seek to send a text message with a smartphone are required to utilize one or both hands and take their eyes off of the road. Furthermore, drivers who do not have both hands available for driving will likely not signal properly, not shift a standard transmission properly, or otherwise deny the road and nearby drivers the attention they deserve.

Thus, an unmet need exists to provide a driver with an apparatus to hold a communication device in a manner that provides for hands-free use of the communication device, particularly while driving, visual proximity so that a display of the communication device is easily observed, and audio proximity so that a speaker and a microphone on the electronic device are easily within hearing and speaking distances.

BRIEF SUMMARY OF THE INVENTION

In various exemplary embodiments, the technology described herein provides an apparatus to hold a communication device, such as a cellular phone, personal digital assistant, smart phone, or the like, in a manner that provides for hands-free use of the communication device, particularly while driving, visual proximity so that a display of the communication device is easily observed, and audio proximity so that a speaker and a microphone are easily within hearing and speaking distances.

In one exemplary embodiment, the technology described herein provides a holding apparatus. The holding apparatus includes: an extensible housing configured to receive a portable electronic device in an interior area, wherein the housing is laterally extensible in both vertical and horizontal directions to adjust both a width and a length of the apparatus, and wherein the housing is configured to securely remain in position once extended or retracted to secure the portable electronic device within; and at least one clip disposed upon an exterior surface of the extensible housing and configured to clip upon a support object to secure the holding apparatus.

The holding apparatus also can include a plurality of flexible corner tabs, each tab disposed in a corner on a front side of the holding apparatus, wherein the plurality of flexible corner tabs is configured to allow flexible entry of the portable electronic device into the interior area of the holding apparatus and to secure the portable electronic device until removal by a user.

The holding apparatus further can include: a plurality of extender plates disposed upon the extensible housing and configured to extend the distance between a plurality of sections of the extensible housing one from another in both vertical and horizontal directions to adjust both a width and a length of the apparatus, to accommodate a larger portable electronic device; and a plurality of channels integrally formed within the extensible housing and configured to securely receive the plurality of extender plates, wherein the plurality of extender plates can extend from the plurality of channels and retract back into the plurality of channels as selected by a user.

The holding apparatus also can include: a plurality of notches integrally formed upon each of the plurality of extender plates; and a plurality of groves integrally formed within each of the plurality of channels and configured to receive the plurality of notches to secure the extensible housing in a desired position. The plurality of extender plates is configured to slide within the plurality of channels to select a desired width and length of the extensible housing. The plurality of notches is configured to snap into the plurality of groves to secure the plurality of extender plates within the plurality of channels and securely remain until removed by the user.

The extender plates of the holding apparatus further can include: a plurality of extender back plates disposed upon a back portion of the extensible housing and configured to provide structural support to the back side the extensible housing and the portable electronic device placed within and configured to extend the distance between a plurality of sections of the extensible housing one from another in the horizontal direction to adjust the width, to accommodate a larger portable electronic device; and four extender side plates disposed upon each of four sides of the extensible housing and configured to extend the distance between a plurality of sections of the extensible housing one from another in both vertical and horizontal directions to adjust both a width and a length of the apparatus, to accommodate a larger portable electronic device.

The extensible housing of the holding apparatus also can include an upper right section, upper left section, lower right section, and lower left section, wherein each section approximates a quarter of the extensible housing, and wherein the sections are separable from one another.

The holding apparatus further can include a plurality of vents integrally formed within the extensible housing and configured to provide an exhaust path and cooling path for the portable electronic device secured within the extensible housing.

In another exemplary embodiment, the technology described herein provides a holding apparatus for a portable electronic device. The holding apparatus for a portable electronic device includes: an extensible housing configured to receive a portable electronic device in an interior area, having an upper right section, upper left section, lower right section, and lower left section, wherein each section approximates a quarter of the extensible housing, wherein the sections are separable from one another, and wherein the housing is extensible in both vertical and horizontal directions to adjust both a width and a length of the apparatus, and wherein the housing is configured to securely remain in position once extended or retracted to secure the portable electronic device within; and at least one clip disposed upon an exterior surface of the extensible housing and configured to clip upon a support object to secure the holding apparatus.

The holding apparatus for a portable electronic device also can include a plurality of flexible corner tabs, each tab disposed in a corner on a front side of the holding apparatus, wherein the plurality of flexible corner tabs is configured to allow flexible entry of the portable electronic device into the interior area of the holding apparatus and to secure the portable electronic device until removal by a user.

The holding apparatus for a portable electronic device further can include: a plurality of extender plates disposed upon the extensible housing and configured to extend the distance between a plurality of sections of the extensible housing one from another in both vertical and horizontal directions to adjust both a width and a length of the apparatus, to accommodate a larger portable electronic device; and a plurality of channels integrally formed within the extensible housing and configured to securely receive the plurality of extender plates, wherein the plurality of extender plates can extend from the plurality of channels and retract back into the plurality of channels as selected by a user.

The holding apparatus for a portable electronic device also can include: a plurality of notches integrally formed upon each of the plurality of extender plates; and a plurality of groves integrally formed within each of the plurality of channels and configured to receive the plurality of notches to secure the extensible housing in a desired position. The plurality of extender plates is configured to slide within the plurality of channels to select a desired width and length of the extensible housing. The plurality of notches is configured to snap into the plurality of groves to secure the plurality of extender plates within the plurality of channels and securely remain until removed by the user.

The plurality of extender plates of the holding apparatus for a portable electronic device further can include: a plurality of extender back plates disposed upon a back portion of the extensible housing and configured to provide structural support to the back side the extensible housing and the portable electronic device placed within and configured to extend the distance between a plurality of sections of the extensible housing one from another in the horizontal direction to adjust the width, to accommodate a larger portable electronic device; and four extender side plates disposed upon each of four sides of the extensible housing and configured to extend the distance between a plurality of sections of the extensible housing one from another in both vertical and horizontal directions to adjust both a width and a length of the apparatus, to accommodate a larger portable electronic device.

The holding apparatus for a portable electronic device also can include a plurality of vents integrally formed within the extensible housing and configured to provide an exhaust path and cooling path for the portable electronic device secured within the extensible housing.

In yet another exemplary embodiment, the technology described herein provides a visor clip holding apparatus adapted, for example, for use in a vehicle clipped to a visor. Placement of the device on a visor provides for hands-free operation of the communication device. Visual proximity is provided in that the user can see the phone in the line of sight to the road, without taking ones eyes from the road. Audio proximity is provided in that the user is close to the speaker through which to hear and close to the microphone through which to speak.

The visor clip holding apparatus includes: an extensible housing configured to couple to a visor and configured to receive a portable electronic device in an interior area of the extensible housing, having an upper right section, upper left section, lower right section, and lower left section, wherein each section approximates a quarter of the extensible housing, wherein the sections are separable from one another, and wherein the housing is extensible in both vertical and horizontal directions to adjust both a width and a length of the apparatus, and wherein the housing is configured to securely remain in position once extended or retracted to secure the portable electronic device within; a pair of clips disposed upon an exterior surface of the extensible housing and configured to clip upon a visor to secure the holding apparatus in a manner that provides for hands-free use of the portable electronic device, particularly while driving, visual proximity so that a display of the portable electronic device is easily observed, and audio proximity so that a speaker and a microphone are easily within hearing and speaking distances; and a plurality of flexible corner tabs, each tab disposed in a corner on a front side of the holding apparatus, wherein the plurality of flexible corner tabs is configured to allow flexible entry of the portable electronic device into the interior area of the holding apparatus and to secure the portable electronic device until removal by a user.

The visor clip holding apparatus also can include: a plurality of extender plates disposed upon the extensible housing and configured to extend the distance between a plurality of sections of the extensible housing one from another in both vertical and horizontal directions to adjust both a width and a length of the apparatus, to accommodate a larger portable electronic device; and a plurality of channels integrally formed within the extensible housing and configured to securely receive the plurality of extender plates, wherein the plurality of extender plates can extend from the plurality of channels and retract back into the plurality of channels as selected by a user.

The visor clip holding apparatus further can include: a plurality of notches integrally formed upon each of the plurality of extender plates; and a plurality of groves integrally formed within each of the plurality of channels and configured to receive the plurality of notches to secure the extensible housing in a desired position. The plurality of extender plates is configured to slide within the plurality of channels to select a desired width and length of the extensible housing. The plurality of notches is configured to snap into the plurality of groves to secure the plurality of extender plates within the plurality of channels and securely remain until removed by the user.

The plurality of extender plates of the visor clip holding apparatus also can include: a plurality of extender back plates disposed upon a back portion of the extensible housing and configured to provide structural support to the back side the extensible housing and the portable electronic device placed within and configured to extend the distance between a plurality of sections of the extensible housing one from another in the horizontal direction to adjust the width, to accommodate a larger portable electronic device; and four extender side plates disposed upon each of four sides of the extensible housing and configured to extend the distance between a plurality of sections of the extensible housing one from another in both vertical and horizontal directions to adjust both a width and a length of the apparatus, to accommodate a larger portable electronic device.

The visor clip holding apparatus also can include a plurality of vents integrally formed within the extensible housing and configured to provide an exhaust path and cooling path for the portable electronic device secured within the extensible housing.

Advantageously, the technology described herein provides hands free use of a cell phone, or the like, while driving to make and receive calls using the speaker and microphone. Also advantageously, the speaker and microphone are placed very close to the ears and mouth of the driver. Further advantageously, the proximate visual display allows the driver to see who is calling, for example, on the display without moving his or her eyes far from the line of sight to the roadway.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DETAILED DESCRIPTION OF THE INVENTION

Figure 1:
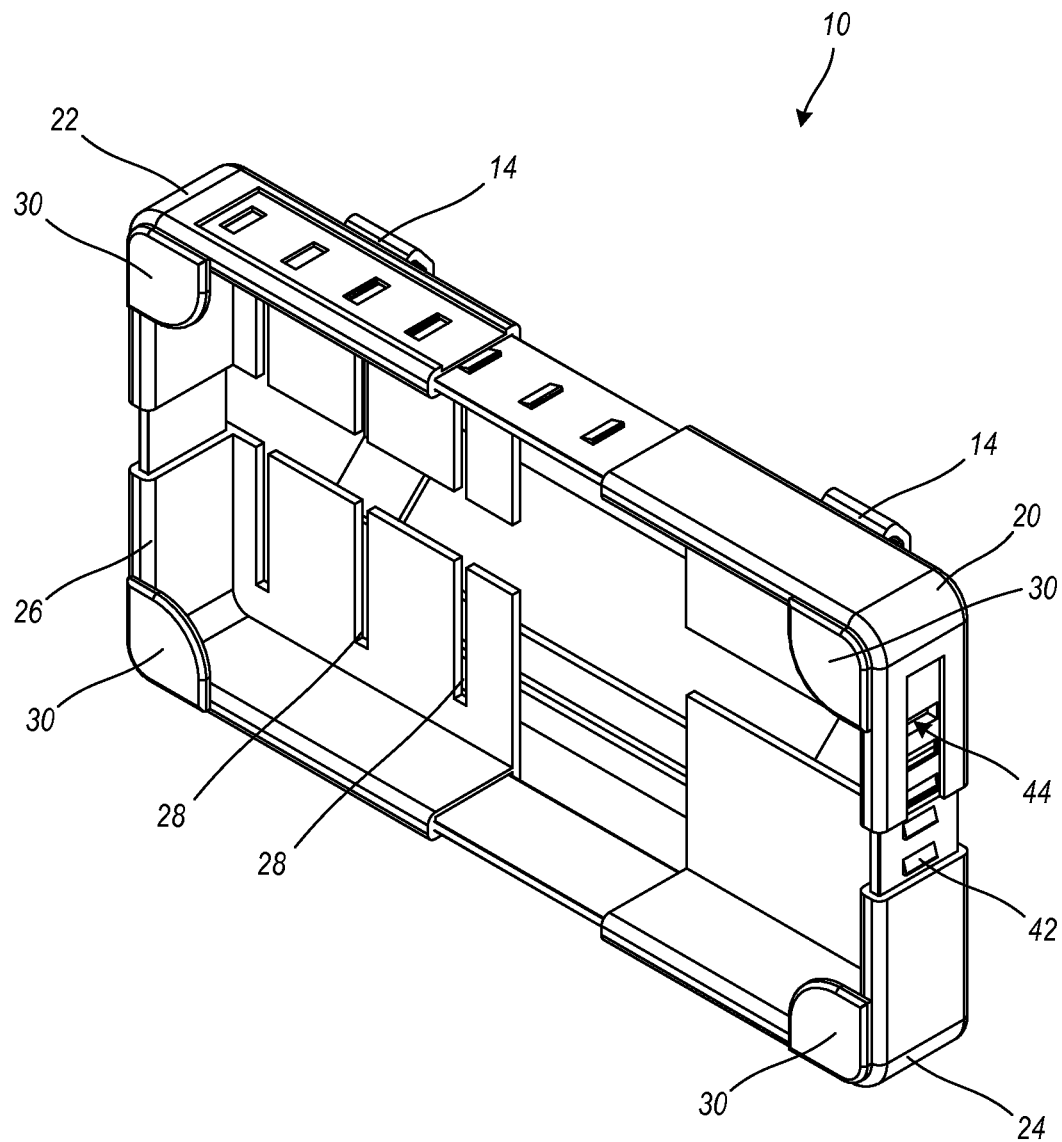
FIG. 1 is a front perspective view of a holding apparatus for a portable electronic device, illustrating, in particular, the extendibility of the device to accommodate varying sizes of portable electronic devices, according to an embodiment of the technology described herein.
Figure 2:
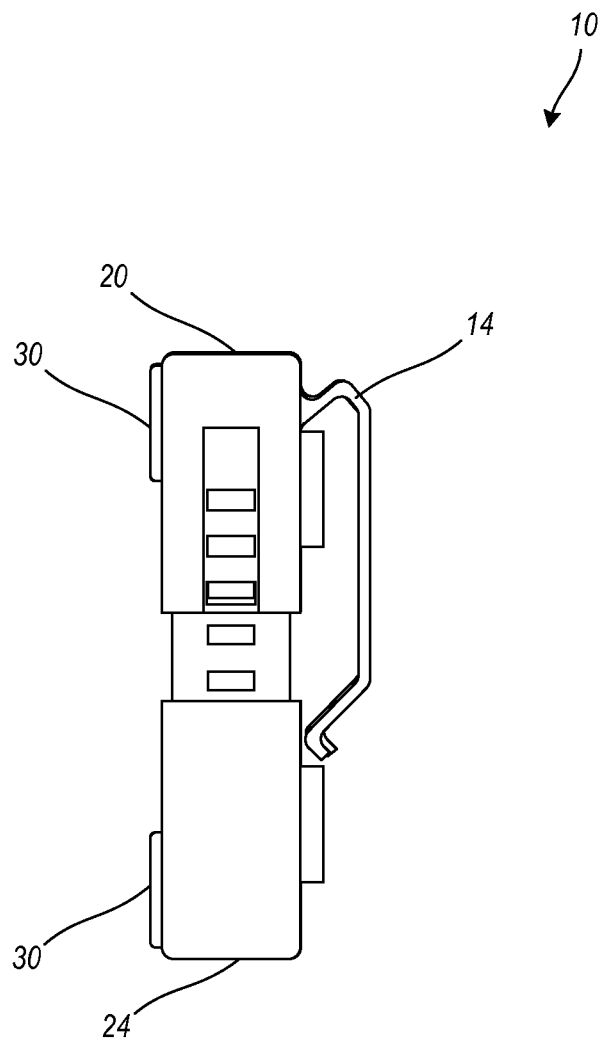
FIG. 2 is a right side planar view of the holding apparatus depicted in FIG. 1, illustrating, in particular, the clips, notches, and grooves, according to an embodiment of the technology described herein.
Figure 3:
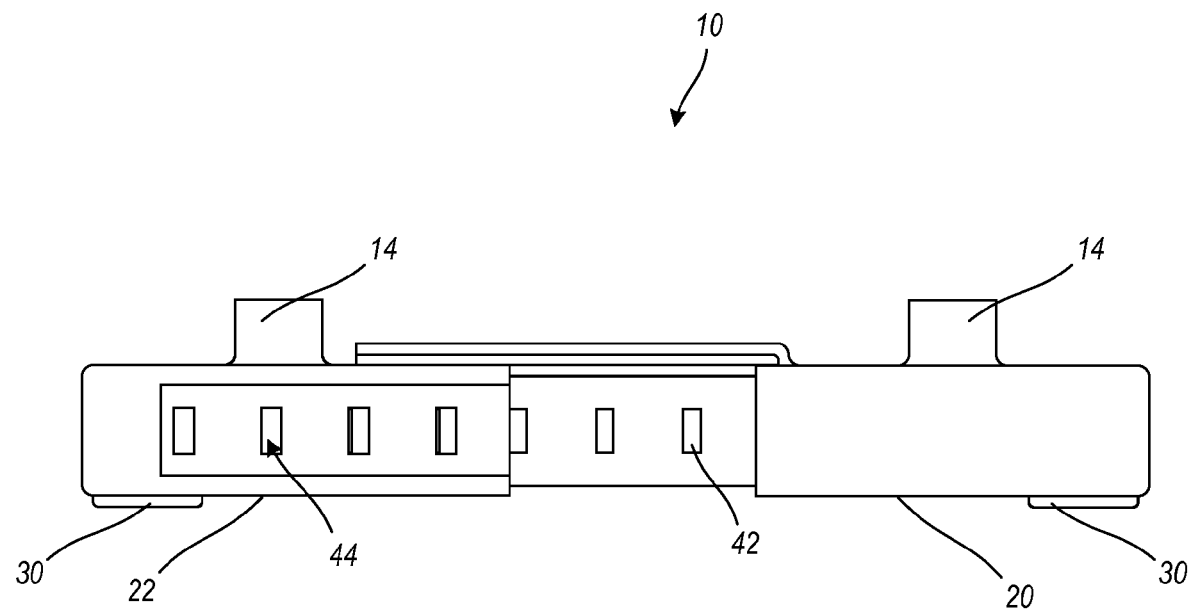
FIG. 3 is a top planar view of the holding apparatus depicted in FIG. 1, illustrating, in particular, the clips, notches, and grooves, according to an embodiment of the technology described herein.
Figure 4:
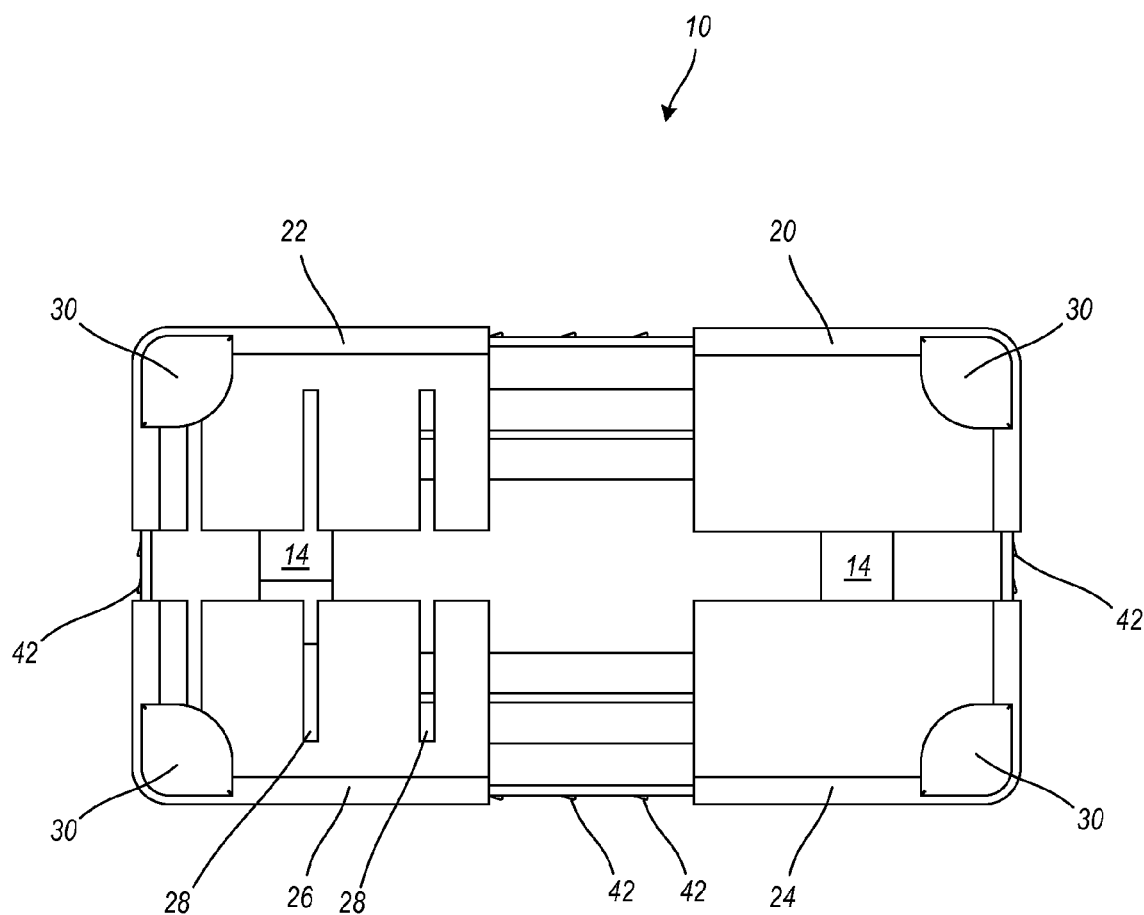
FIG. 4 is a rear planar view of the holding apparatus depicted in FIG. 1, illustrating, in particular, the vents, according to an embodiment of the technology described herein.
Figure 5:
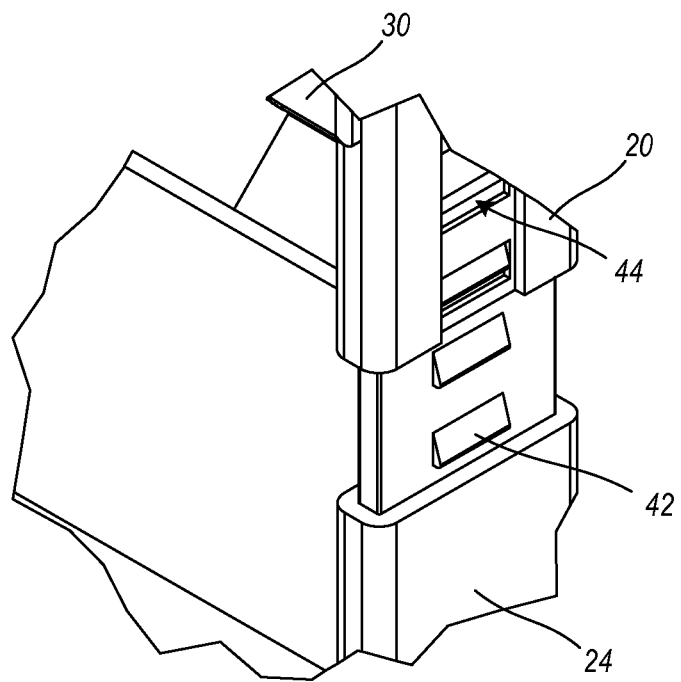
FIG. 5 is a close-up perspective view of the holding apparatus depicted in FIG. 1, illustrating, in particular, the notches, grooves, and extensions which provide the extendibility of the device to accommodate varying sizes of portable electronic devices according to an embodiment of the technology described herein.
Figure 6:
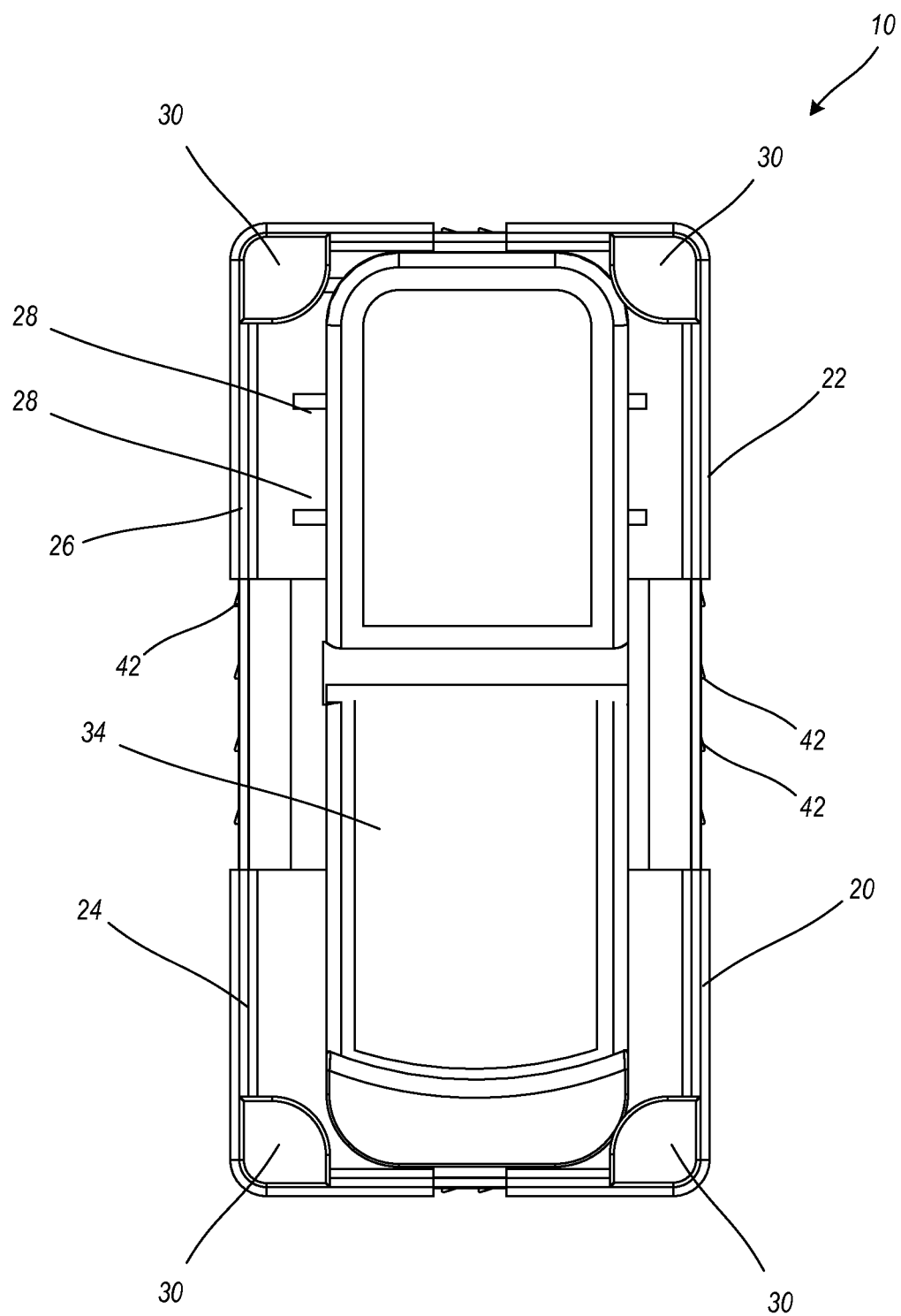
FIG. 6 is a front planar view of the holding apparatus, illustrating, in particular, the extenders in an extended state to accommodate a flip phone, or the like, in a folded out position.
Figure 7:
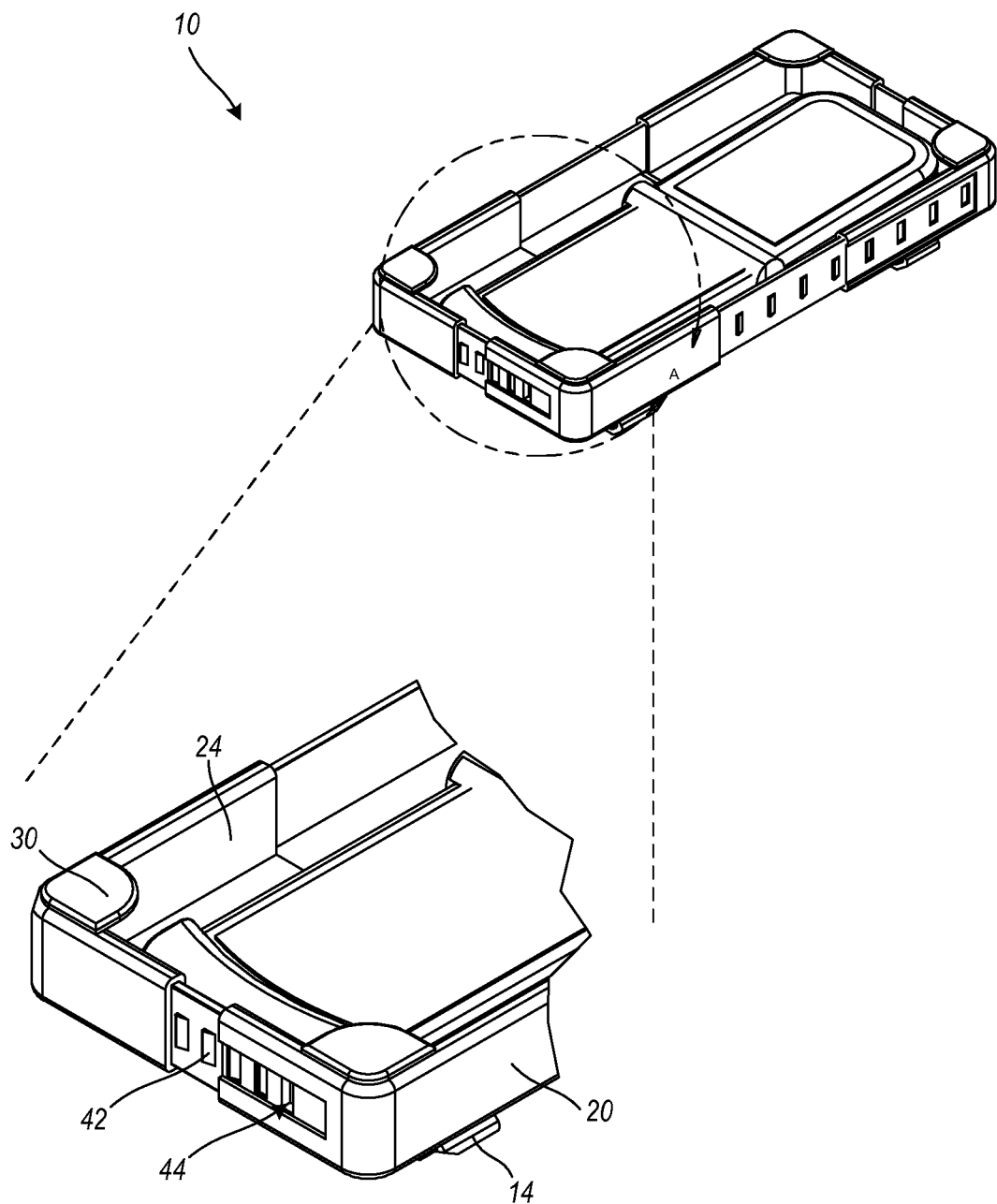
FIG. 7 is a front perspective view of the holding apparatus, illustrating, in particular, the extenders in an extended state to accommodate a flip phone, or the like, in a folded out position, and showing a close-up view of the notches, grooves, and extensions which provide the extendibility of the device to accommodate varying sizes of portable electronic devices, according to an embodiment of the technology described herein.
Figure 8:
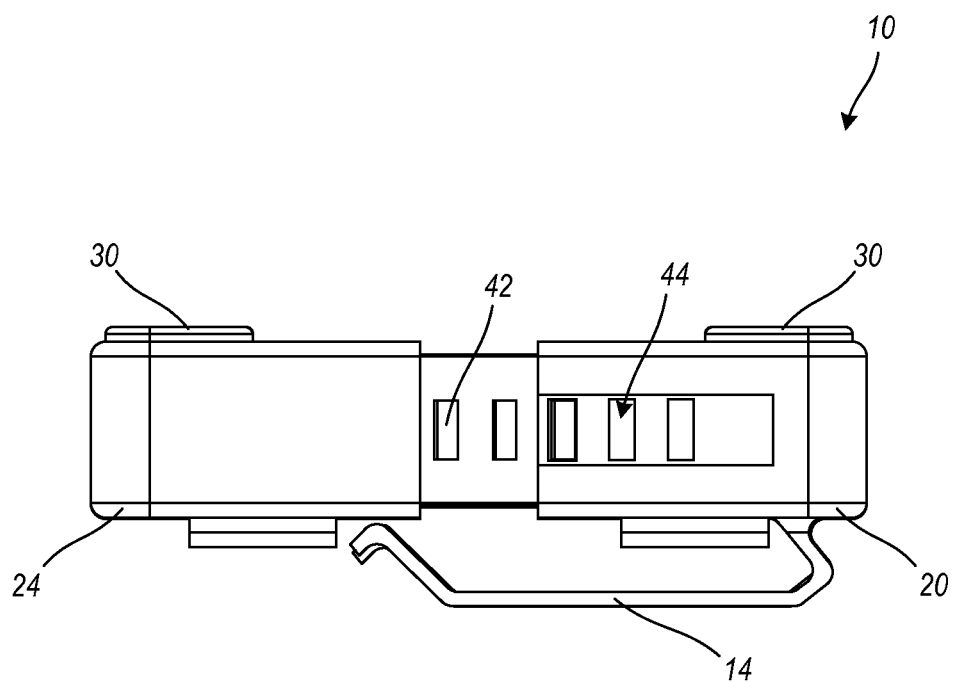
FIG. 8 is a side planar view of the holding apparatus, illustrating, in particular, the notches, grooves, and extensions which provide the extendibility of the device.
Figure 9:
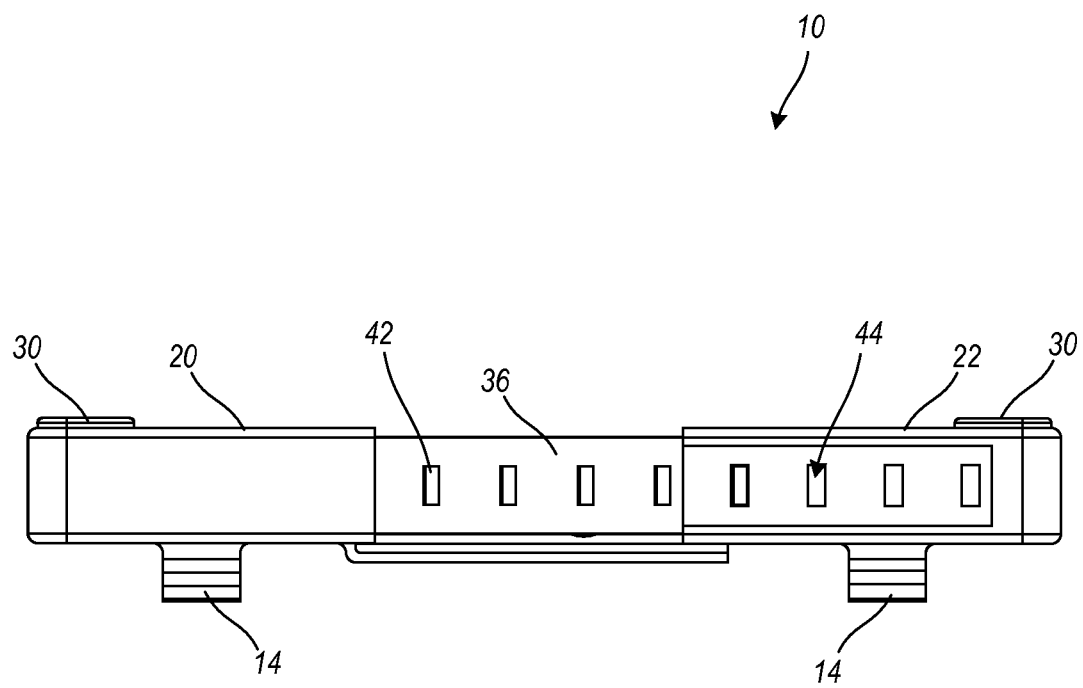
FIG. 9 is a top planar view of the holding apparatus, illustrating, in particular, the notches, grooves, and extensions which provide the extendibility of the device.
Figure 10:
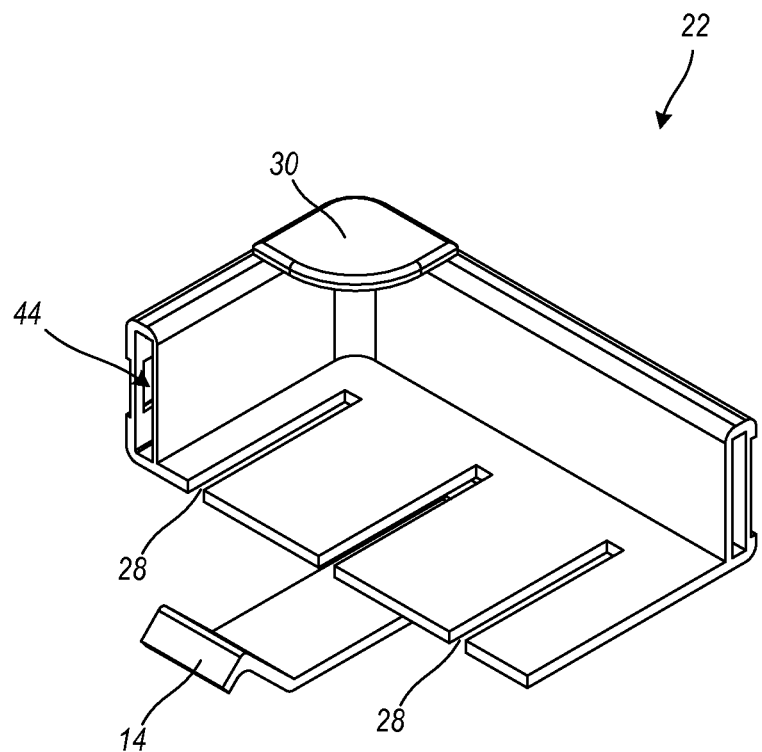
FIG. 10 is a front perspective view of the upper left section of the holding apparatus, according to an embodiment of the technology described herein.
Figure 11:
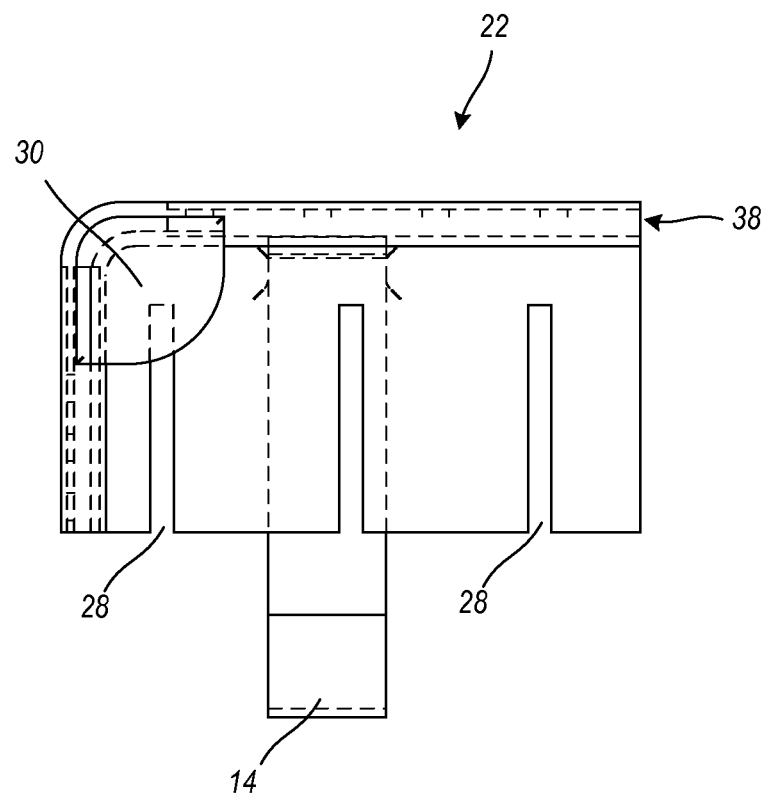
FIG. 11 is a front planar view of the upper left section of the holding apparatus depicted in FIG. 10.
Figure 12:
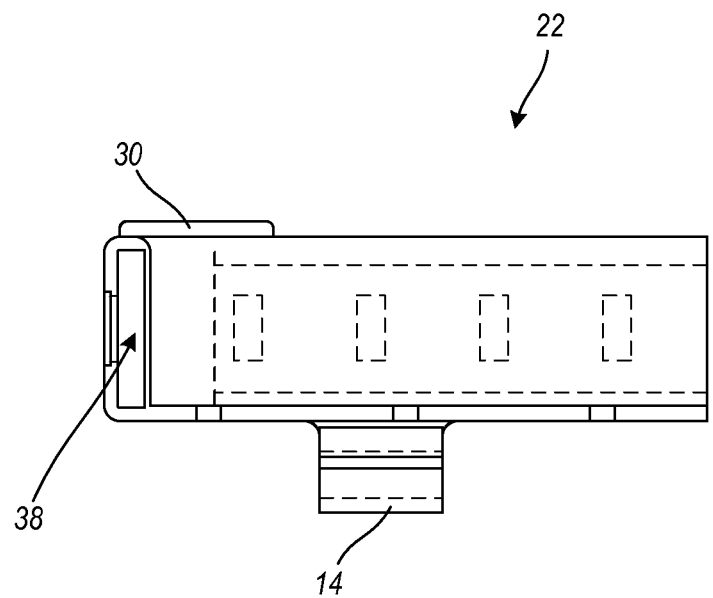
FIG. 12 is a top planar view of the upper left section of the holding apparatus depicted in FIG. 10.
Figure 13:
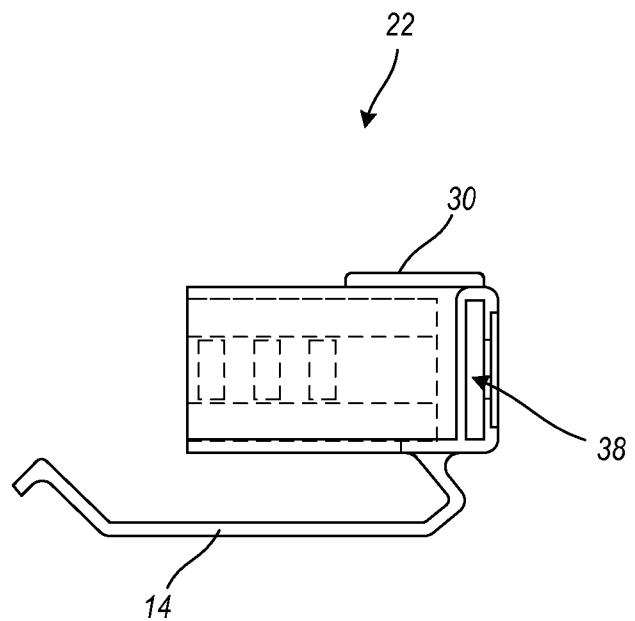
FIG. 13 is a side planar view of the upper left section of the holding apparatus depicted in FIG. 10.
Figure 14:
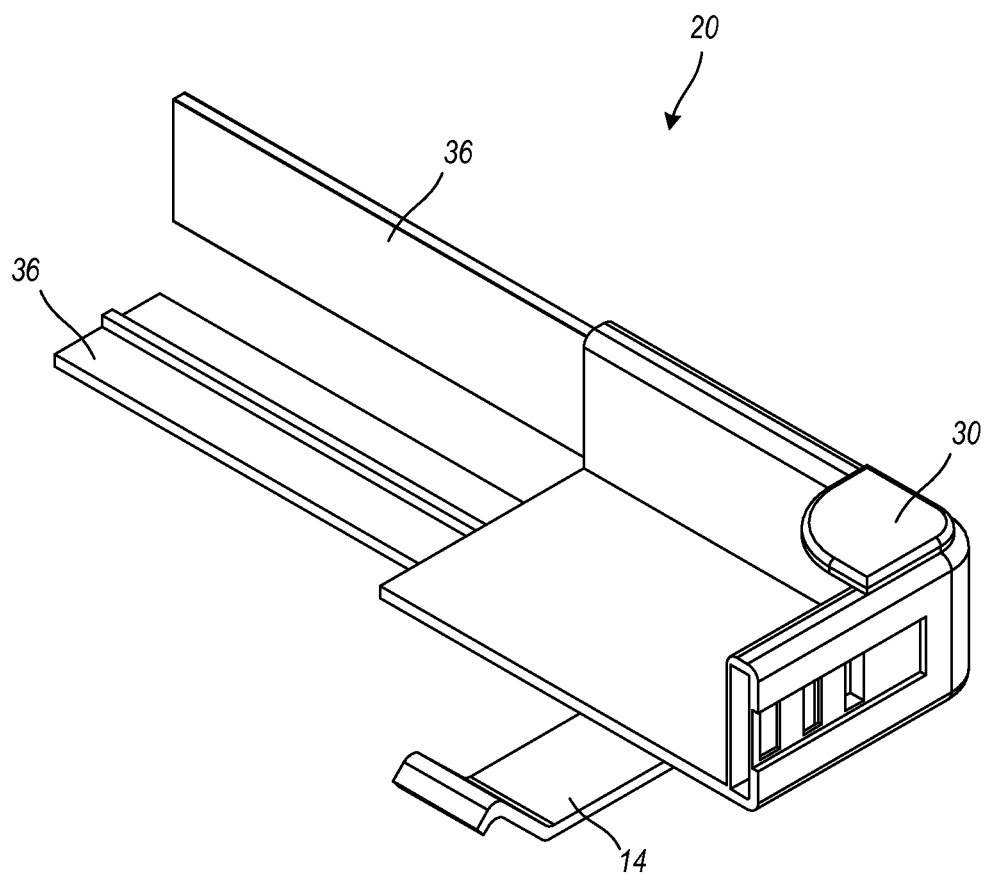
FIG. 14 is a front perspective view of the upper right section of the holding apparatus, according to an embodiment of the technology described herein.
Figure 15:
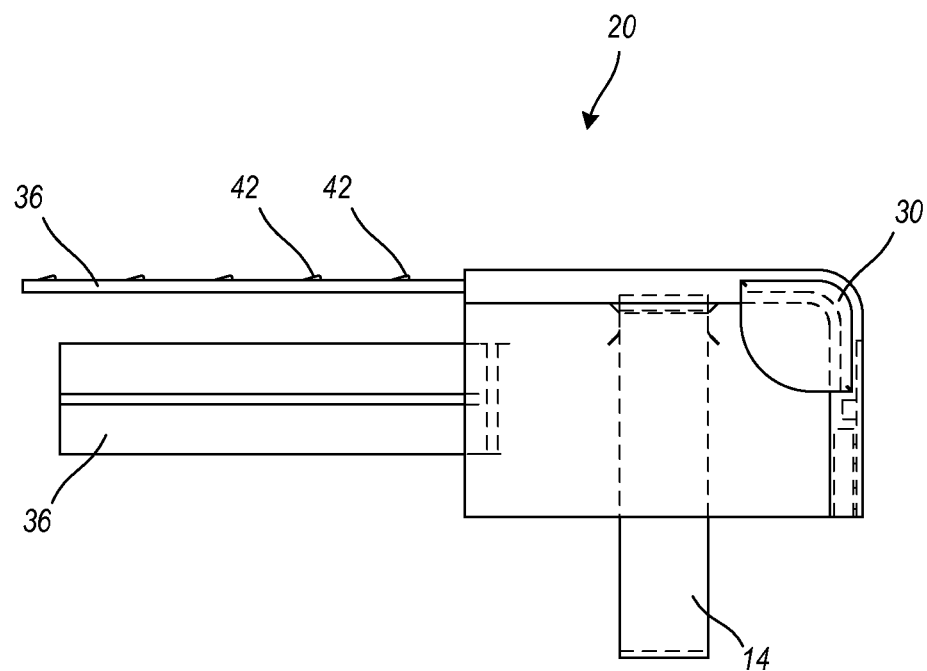
FIG. 15 is a front planar view of the upper right section of the holding apparatus depicted in FIG. 14.
Figure 16:
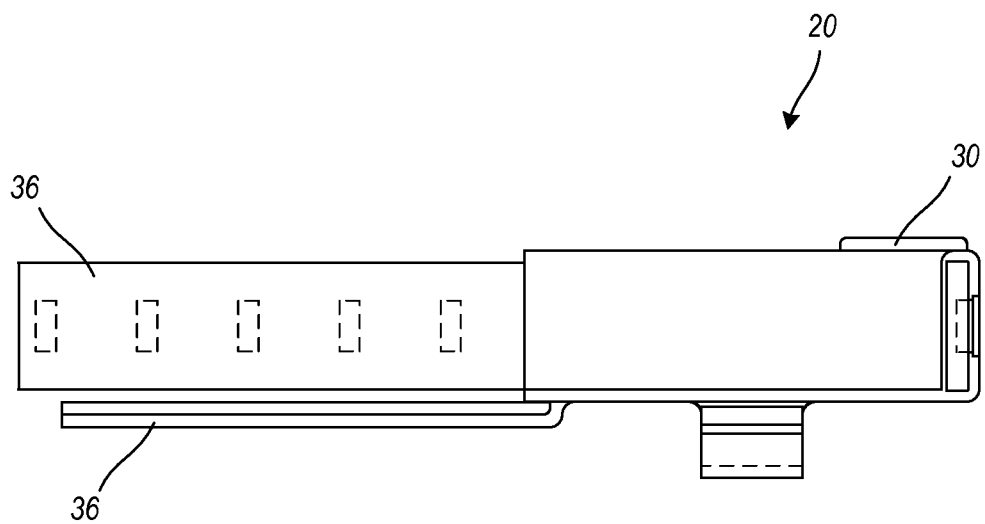
FIG. 16 is a top planar view of the upper right section of the holding apparatus depicted in FIG. 14.
Figure 17:
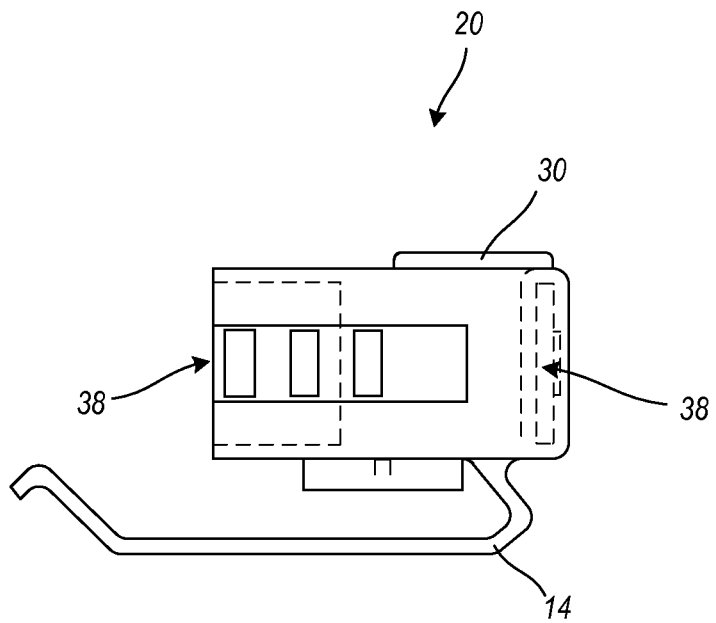
FIG. 17 is a side planar view of the upper right section of the holding apparatus depicted in FIG. 14.
Figure 18:
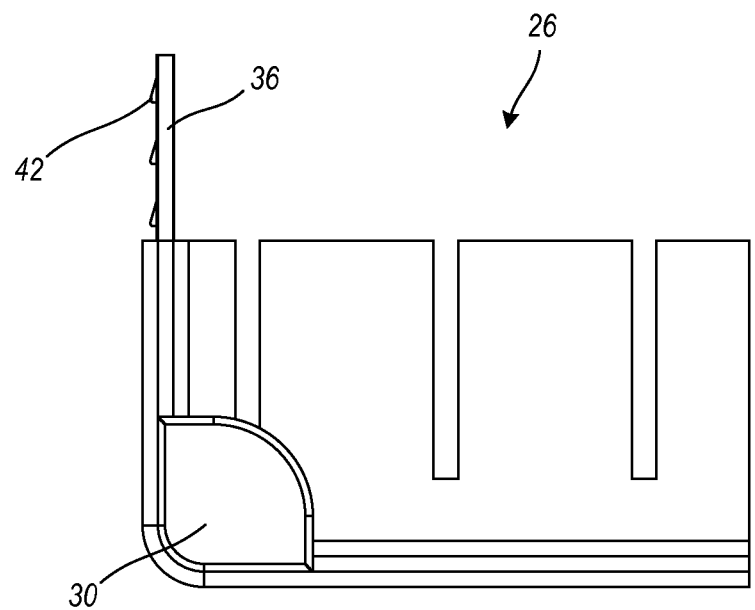
FIG. 18 is a front planar view of the lower left section of the holding apparatus.
Figure 19:
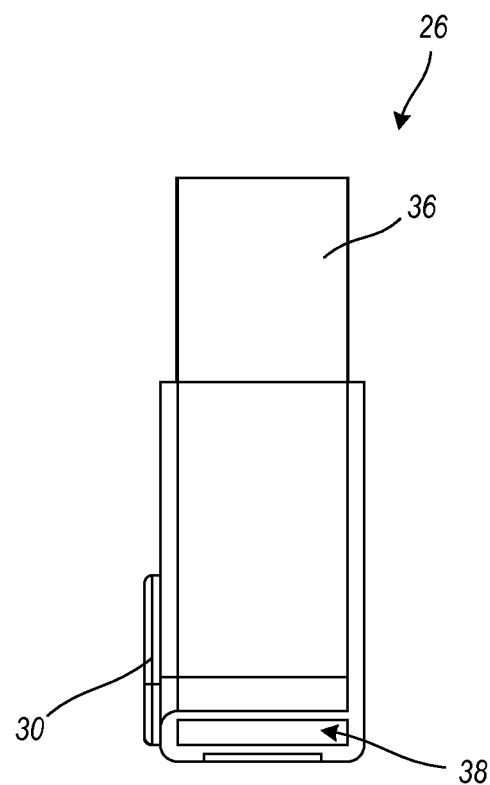
FIG. 19 is a side planar view of the lower left section of the holding apparatus.
Figure 20:
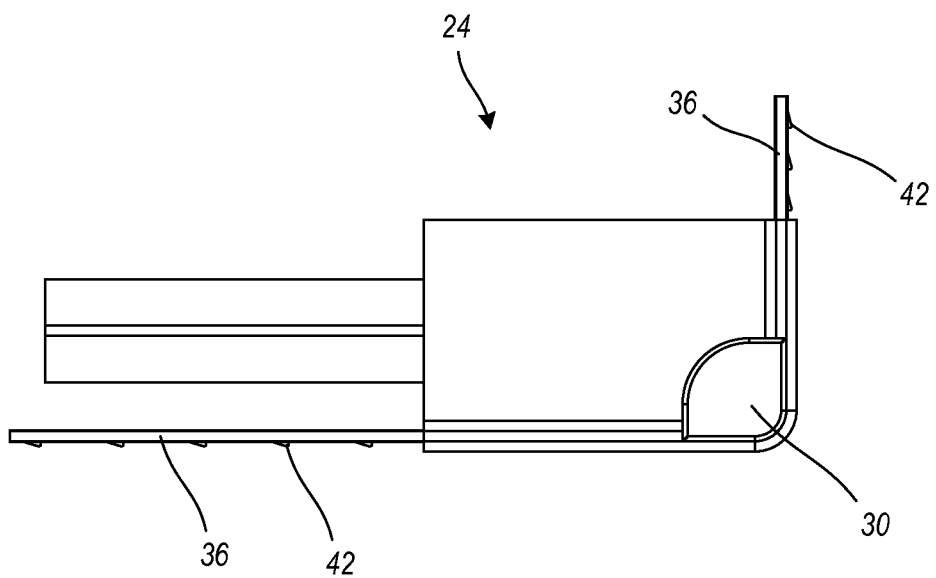
FIG. 20 is a front planar view of the lower right section of the holding apparatus.
Figure 21:
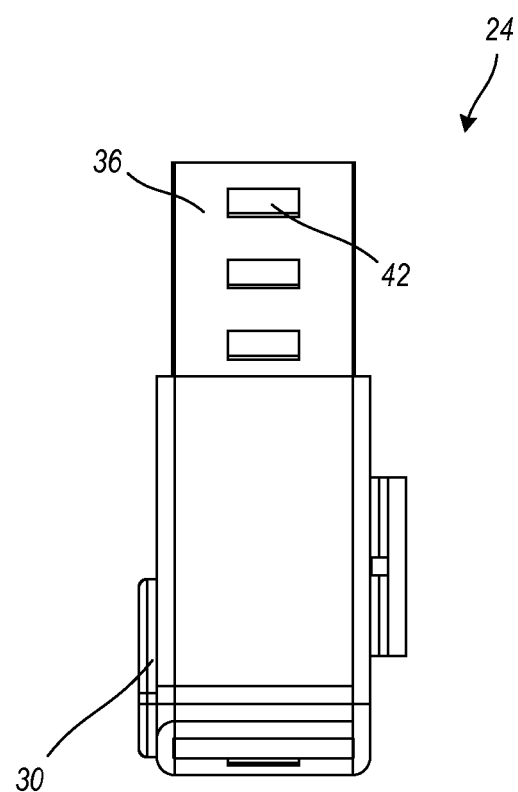
FIG. 21 is a side planar view of the lower right section of the holding apparatus.

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides an apparatus to hold a communication device, such as a cellular phone, personal digital assistant, smart phone, or the like, in a manner that provides for hands-free use of the communication device, particularly while driving, visual proximity so that a display of the communication device is easily observed, and audio proximity so that a speaker and a microphone are easily within hearing and speaking distances.

Referring now to the Figures a holding apparatus 10 is shown. The holding apparatus 10 adapted, for example, for use in a vehicle clipped to a visor. Placement of the device 10 on a visor provides for hands-free operation of the communication device. By way of example, visual proximity to the device 10 is provided in that the user can see the phone, or the like, in the line of sight to the road, without taking ones eyes from the road. Also by way of example, audio proximity is provided to the device 10 in that the user is close to the speaker through which to hear and close to the microphone through which to speak. The holding apparatus 10 is flexible in use and can accommodate various positions and angles in use. The holding apparatus 10 is retractable and can be securely and discretely stowed behind the visor.

The holding apparatus 10 includes an extensible housing configured to receive a portable electronic device 34 in an interior area. The holding apparatus 10 is manufactured of a durable plastic material in at least one embodiment. The holding apparatus 10 is laterally extensible in both vertical and horizontal directions to adjust both a width and a length of the apparatus. The holding apparatus 10 is configured to securely remain in position once extended or retracted to secure the portable electronic device 34 stored within the housing. The holding apparatus 10 includes at least one clip 14 disposed upon an exterior surface of the extensible housing and configured to clip upon a support object to secure the holding apparatus 10. The clip 14 can be manufactured of metal, plastic, or other suitable durable material to securely maintain the holding apparatus to another object such as an automobile visor.

The holding apparatus 10 includes flexible corner tabs 30 in at least one embodiment. As depicted in the Figures, the holding apparatus 10 includes four corner tabs 30, one at each of the corners of the generally rectangular device. Each tab 30 is disposed in a corner on a front side of the holding apparatus 10. The flexible corner tabs 30 are configured to allow flexible entry of the portable electronic device 34 into the interior area of the holding apparatus 10 and to secure the portable electronic device 34 until removal by a user.

In at least one embodiment, the holding apparatus 10 includes extender plates 36 disposed upon the extensible housing. The extender plates 36 are configured to extend the distance between multiple sections of the extensible housing one from another in both vertical and horizontal directions to adjust both a width and a length of the apparatus 10, to accommodate a larger portable electronic device 34. The holding apparatus 10 includes channels 38 integrally formed within the extensible housing. The channels 38 are configured to securely receive the plurality of extender plates 36. The extender plates 36 can extend from the channels 38 and retract back into the channels 38 as selected by a user.

In at least one embodiment, the holding apparatus 10 includes notches 42 integrally formed upon each of the extender plates 36. The holding apparatus 10 includes groves 44 integrally formed within each of the channels 38. The groves 44 are configured to receive the notches 42 to secure the extensible housing in a desired position. The extender plates 36 are configured to slide within the channels 38 to select a desired width and length of the extensible housing. The notches 42 are configured to snap into the groves 44 to secure the extender plates 36 within the channels 38 and securely remain there until removed by the user. The extender plates 36 are depressible gently to release the notches 42 from the grooves 44.

In at least one embodiment, the extender plates 36 of the holding apparatus 10 are defined by extender back plates disposed upon a back portion of the holding apparatus 10. The extender back plates are configured to provide structural support to the back side the extensible housing and the portable electronic device 34 placed within. The extender back plates are configured to extend the distance between sections of the extensible housing one from another in the horizontal direction to adjust the width, to accommodate a larger portable electronic device 34.

In at least one embodiment, the extender plates 36 of the holding apparatus 10 are defined by four extender side plates disposed upon each of four sides of the extensible housing and configured to extend the distance between a plurality of sections of the extensible housing one from another in both vertical and horizontal directions to adjust both a width and a length of the apparatus, to accommodate a larger portable electronic device 34.

In at least one embodiment, the holding apparatus 10 includes an upper right section 20, upper left section 22, lower right section 24, and lower left section 26. Each section 20, 22, 24, 26 approximates a quarter of the extensible housing of the holding apparatus 10. The sections 20, 22, 24, 26 are separable from one another. As such, the holding apparatus 10 is extensible in both vertical and horizontal directions to adjust both a width and a length of the apparatus. Also the holding apparatus 10 is configured to securely remain in position once extended or retracted to secure the portable electronic device 34 within.

The holding apparatus 10 includes multiple vents 28 in at least one embodiment. The vents 28 are integrally formed within the extensible housing and configured to provide an exhaust path and cooling path for the portable electronic device 34 secured within the holding apparatus 10. The vents 28 integrally formed within the extensible housing can vary in number and size.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A holding apparatus comprising:
   an extensible housing configured to receive a portable electronic device in an interior area, wherein the housing is laterally extensible in both vertical and horizontal directions to adjust both a width and a length of the apparatus, and wherein the housing is configured to securely remain in position once extended or retracted to secure the portable electronic device within;
   at least one clip disposed upon an exterior surface of the extensible housing and configured to clip upon a support object to secure the holding apparatus;
   a plurality of depressible extender plates disposed upon the extensible housing and configured to extend the distance between a plurality of sections of the extensible housing one from another in both vertical and horizontal directions to adjust both a width and a length of the apparatus, to accommodate a larger portable electronic device;

a plurality of channels integrally formed within the extensible housing and configured to securely receive the plurality of extender plates, wherein the plurality of extender plates can extend from the plurality of channels and retract back into the plurality of channels as selected by a user;

a plurality of notches integrally formed upon each of the plurality of extender plates;

a plurality of groves integrally formed within each of the plurality of channels and configured to receive the plurality of notches to secure the extensible housing in a desired position;

wherein the plurality of depressible extender plates is configured to slide within the plurality of channels to select a desired width and length of the extensible housing and to be depressed to release notches from the grooves;

wherein the plurality of notches is configured to snap into the plurality of groves to secure the plurality of extender plates within the plurality of channels and securely remain until removed by the user; and a plurality of vents integrally formed within the extensible housing and configured to provide an exhaust path and cooling path for the portable electronic device secured within the extensible housing.

2. The holding apparatus of claim 1, further comprising:
a plurality of flexible corner tabs, each tab disposed in a corner on a front side of the holding apparatus, wherein the plurality of flexible corner tabs is configured to allow flexible entry of the portable electronic device into the interior area of the holding apparatus and to secure the portable electronic device until removal by a user.

3. The holding apparatus of claim 1, wherein the plurality of extender plates further comprises:
a plurality of extender back plates disposed upon a back portion of the extensible housing and configured to provide structural support to the back side the extensible housing and the portable electronic device placed within and configured to extend the distance between a plurality of sections of the extensible housing one from another in the horizontal direction to adjust the width, to accommodate a larger portable electronic device; and
four extender side plates disposed upon each of four sides of the extensible housing and configured to extend the distance between a plurality of sections of the extensible housing one from another in both vertical and horizontal directions to adjust both a width and a length of the apparatus, to accommodate a larger portable electronic device.

4. The holding apparatus of claim 1, wherein the extensible housing further comprises:
an upper right section, upper left section, lower right section, and lower left section, wherein each section approximates a quarter of the extensible housing, and wherein the sections are separable from one another.

5. The holding apparatus of claim 1, wherein the extensible housing comprises a plastic material.

6. A holding apparatus for a portable electronic device, the holding apparatus comprising:
an extensible housing configured to receive a portable electronic device in an interior area, having an upper right section, upper left section, lower right section, and lower left section, wherein each section approximates a quarter of the extensible housing, wherein the sections are separable from one another, and wherein the housing is extensible in both vertical and horizontal directions to adjust both a width and a length of the apparatus, and wherein the housing is configured to securely remain in position once extended or retracted to secure the portable electronic device within;

at least one clip disposed upon an exterior surface of the extensible housing and configured to clip upon a support object to secure the holding apparatus a plurality of depressible extender plates disposed upon the extensible housing and configured to extend the distance between a plurality of sections of the extensible housing one from another in both vertical and horizontal directions to adjust both a width and a length of the apparatus, to accommodate a larger portable electronic device;

a plurality of channels integrally formed within the extensible housing and configured to securely receive the plurality of extender plates, wherein the plurality of extender plates can extend from the plurality of channels and retract back into the plurality of channels as selected by a user a plurality of notches integrally formed upon each of the plurality of extender plates; and a plurality of groves integrally formed within each of the plurality of channels and configured to receive the plurality of notches to secure the extensible housing in a desired position;

wherein the plurality of depressible extender plates is configured to slide within the plurality of channels to select a desired width and length of the extensible housing and to be depressed to release notches from the grooves:

wherein the plurality of notches is configured to snap into the plurality of groves to secure the plurality of extender plates within the plurality of channels and securely remain until removed by the user; and a plurality of vents integrally formed within the extensible housing and configured to provide an exhaust path and cooling path for the portable electronic device secured within the extensible housing.

7. The holding apparatus of claim 6, further comprising:
a plurality of flexible corner tabs, each tab disposed in a corner on a front side of the holding apparatus, wherein the plurality of flexible corner tabs is configured to allow flexible entry of the portable electronic device into the interior area of the holding apparatus and to secure the portable electronic device until removal by a user.

8. The holding apparatus of claim 6, wherein the plurality of extender plates further comprises:
a plurality of extender back plates disposed upon a back portion of the extensible housing and configured to provide structural support to the back side the extensible housing and the portable electronic device placed within and configured to extend the distance between a plurality of sections of the extensible housing one from another in the horizontal direction to adjust the width, to accommodate a larger portable electronic device; and
four extender side plates disposed upon each of four sides of the extensible housing and configured to extend the distance between a plurality of sections of the extensible housing one from another in both vertical and horizontal directions to adjust both a width and a length of the apparatus, to accommodate a larger portable electronic device.

9. A visor clip holding apparatus comprising:
an extensible housing configured to couple to a visor and configured to receive a portable electronic device in an interior area of the extensible housing, having an upper right section, upper left section, lower right section, and lower left section, wherein each section approximates a quarter of the extensible housing, wherein the sections are separable from one another, and wherein the housing is extensible in both vertical and horizontal directions to adjust both a width and a length of the apparatus, and wherein the housing is configured to securely remain in position once extended or retracted to secure the portable electronic device within;

a pair of clips disposed upon an exterior surface of the extensible housing and configured to clip upon a visor to secure the holding apparatus in a manner that provides for hands-free use of the portable electronic device, particularly while driving, visual proximity so that a display of the portable electronic device is easily observed, and audio proximity so that a speaker and a microphone are easily within hearing and speaking distances;

a plurality of flexible corner tabs, each tab disposed in a corner on a front side of the holding apparatus, wherein the plurality of flexible corner tabs is configured to allow flexible entry of the portable electronic device into the interior area of the holding apparatus and to secure the portable electronic device until removal by a user;

a plurality of depressible extender plates disposed upon the extensible housing and configured to extend the distance between a plurality of sections of the extensible housing one from another in both vertical and horizontal directions to adjust both a width and a length of the apparatus, to accommodate a larger portable electronic device;

a plurality of channels integrally formed within the extensible housing and configured to securely receive the plurality of extender plates, wherein the plurality of extender plates can extend from the plurality of channels and retract back into the plurality of channels as selected by a user;

a plurality of notches integrally formed upon each of the plurality of extender plates;

a plurality of groves integrally formed within each of the plurality of channels and configured to receive the plurality of notches to secure the extensible housing in a desired position;

wherein the plurality of depressible extender plates is configured to slide within the plurality of channels to select a desired width and length of the extensible housing and to be depressed to release notches from the grooves;

wherein the plurality of notches is configured to snap into the plurality of groves to secure the plurality of extender plates within the plurality of channels and securely remain until removed by the user; and a plurality of vents integrally formed within the extensible housing and configured to provide an exhaust path and cooling path for the portable electronic device secured within the extensible housing.

10. The visor clip holding apparatus of claim 9, wherein the plurality of extender plates further comprises:

a plurality of extender back plates disposed upon a back portion of the extensible housing and configured to provide structural support to the back side the extensible housing and the portable electronic device placed within and configured to extend the distance between a plurality of sections of the extensible housing one from another in the horizontal direction to adjust the width, to accommodate a larger portable electronic device; and four extender side plates disposed upon each of four sides of the extensible housing and configured to extend the distance between a plurality of sections of the extensible housing one from another in both vertical and horizontal directions to adjust both a width and a length of the apparatus, to accommodate a larger portable electronic device.

11. The visor clip holding apparatus of claim 9, wherein the extensible housing comprises a plastic material.

* * * * *